Dec. 1, 1925.
C. F. SMITH
DISHWASHING MACHINE
Filed Dec. 10, 1921
1,564,028
4 Sheets-Sheet 2
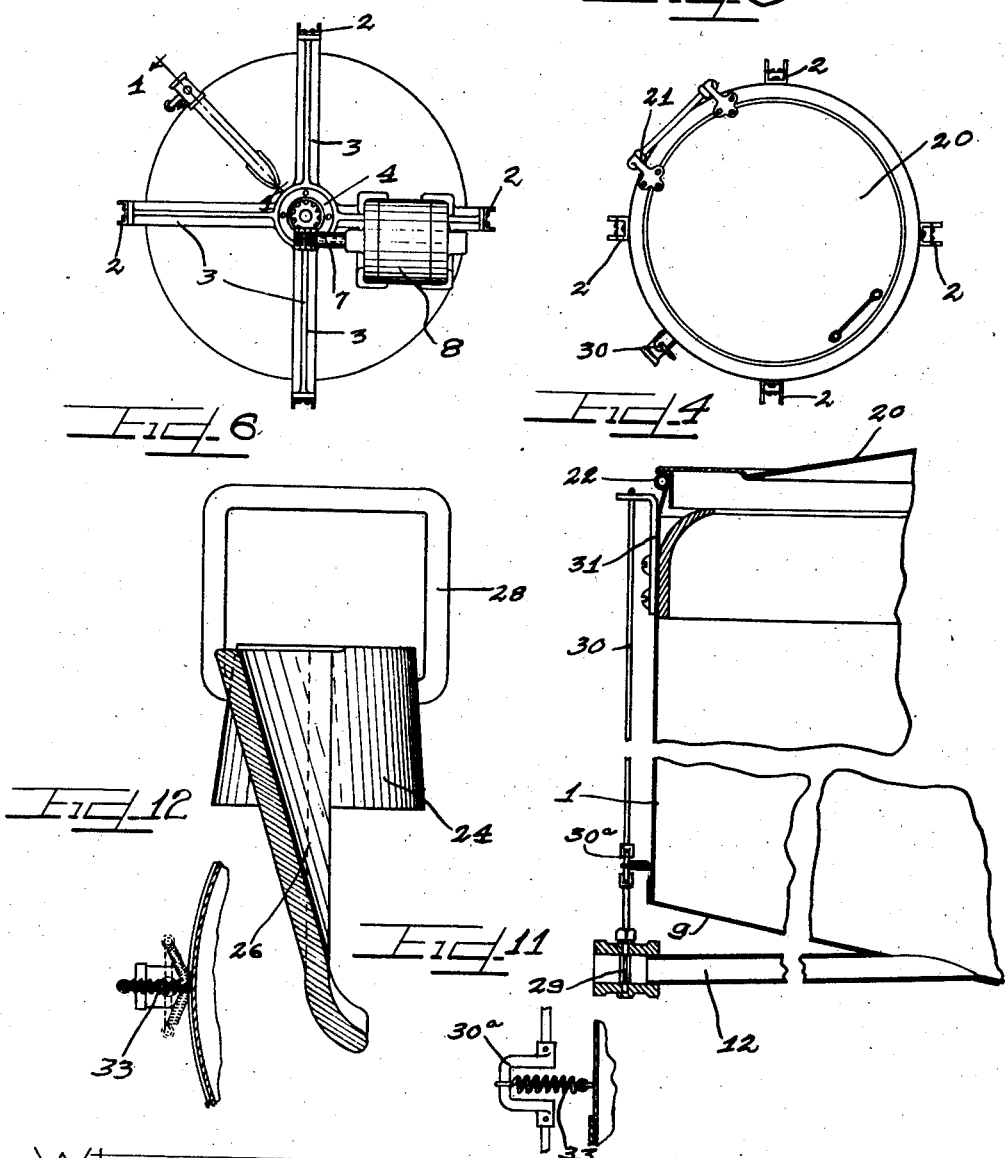

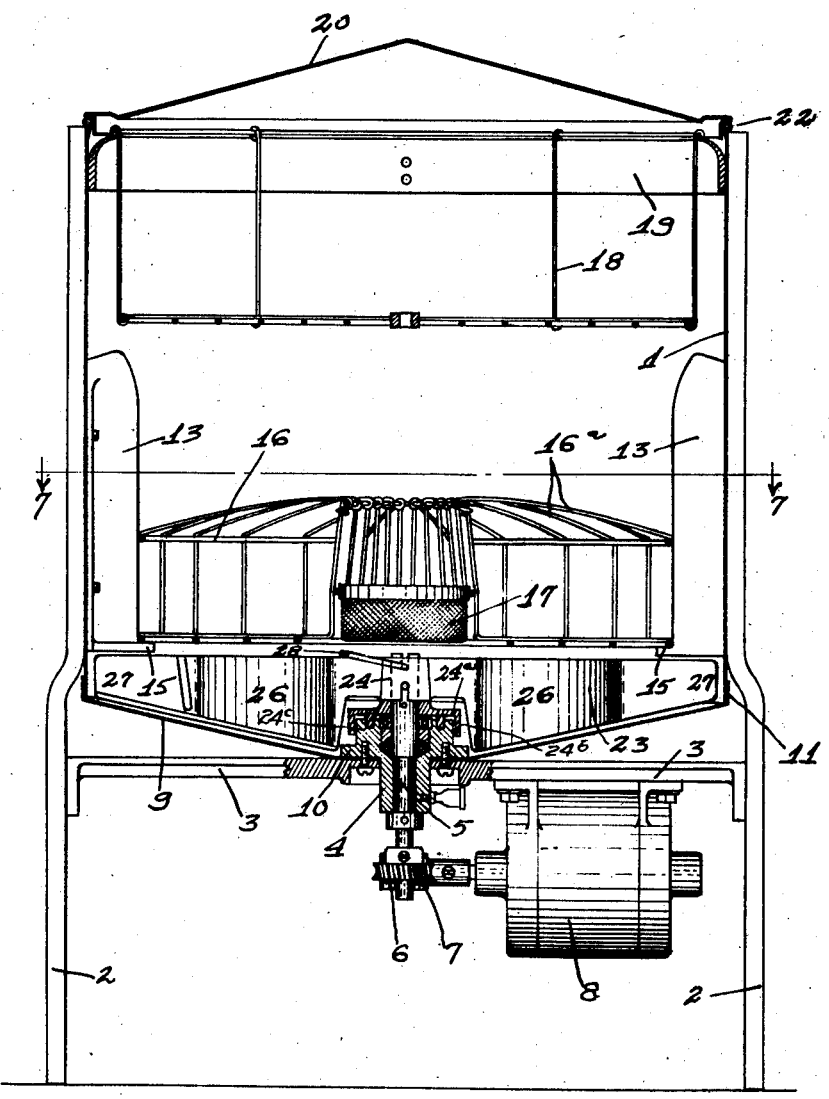

Dec. 1, 1925. 1,564,028
C. F. SMITH
DISHWASHING MACHINE
Filed Dec. 10, 1921 4 Sheets-Sheet 3
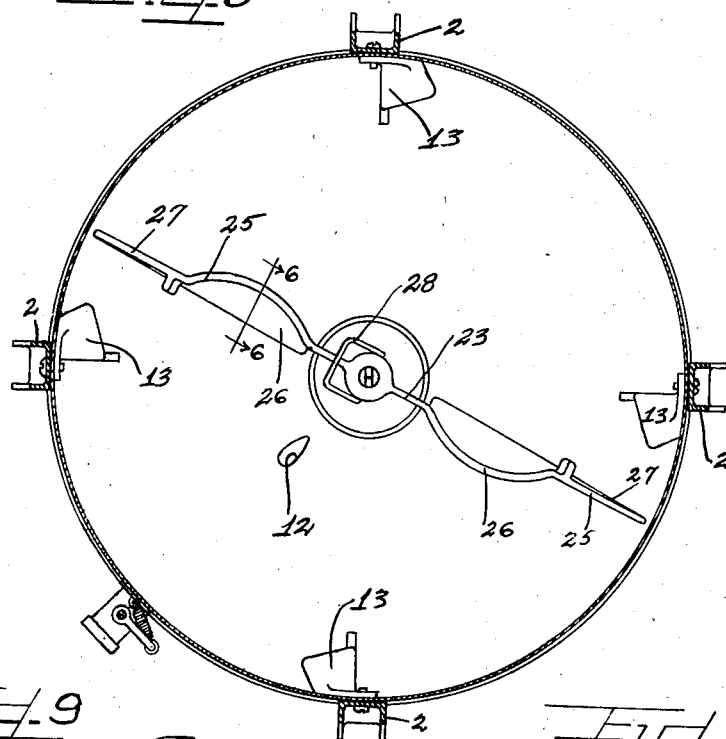
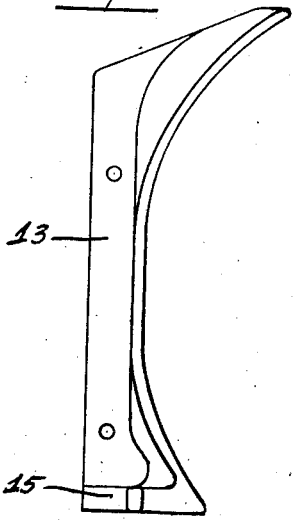
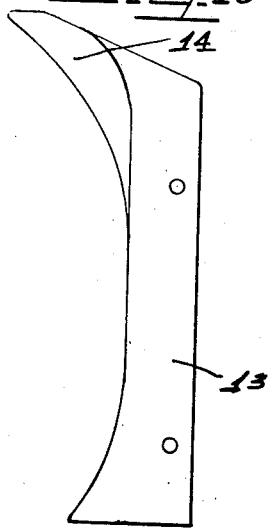

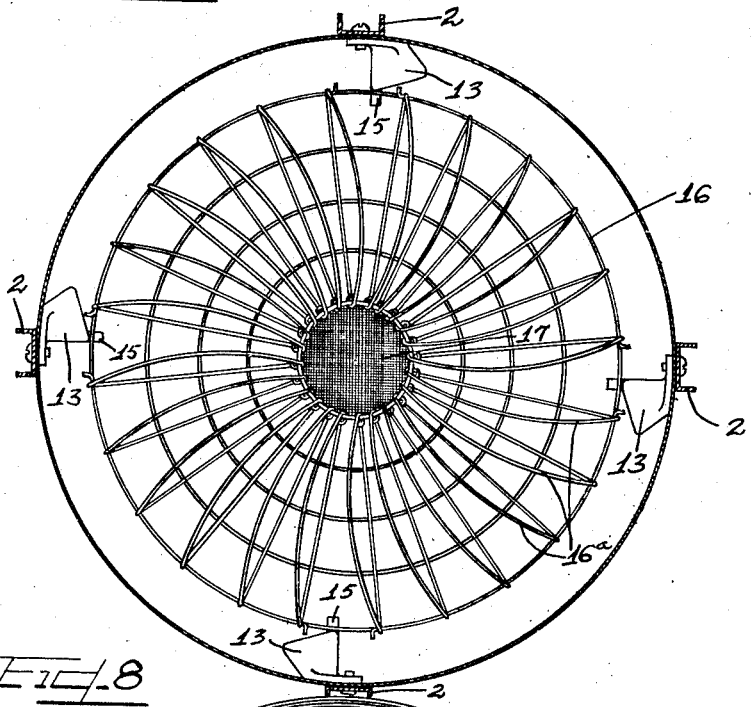
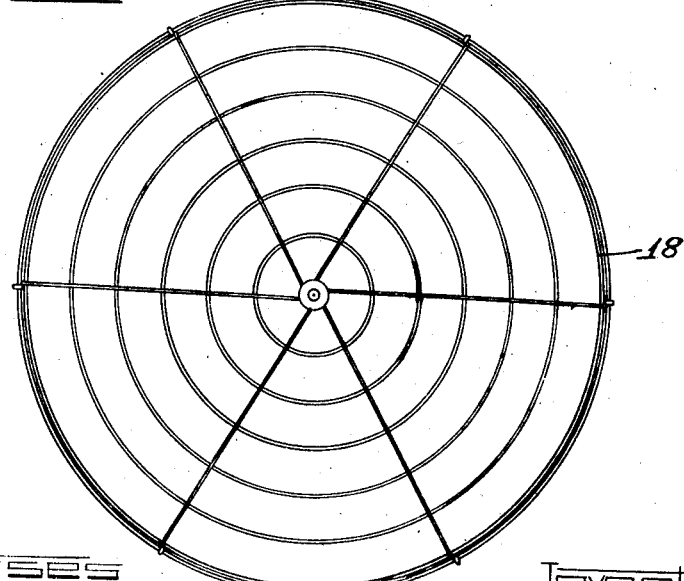

Patented Dec. 1, 1925.

1,564,028

BEST AVAILABLE COPY

UNITED STATES PATENT OFFICE.

CHARLES F. SMITH, OF CHICAGO, ILLINOIS.

DISHWASHING MACHINE.

Application filed December 10, 1921. Serial No. 521,335.

*To all whom it may concern:*

Be it known that I, CHARLES F. SMITH, a citizen of the United States, and a resident of the city of Chicago, in the county of Cook and State of Illinois, have invented certain new and useful Improvements in a Dishwashing Machine; and I do hereby declare that the following is a full, clear, and exact description of the same, reference being had to the accompanying drawings, and to the numerals of reference marked thereon, which form a part of this specification.

My invention relates to machines for washing dishes, and has for its object to provide certain improvements in the details of construction of the same as hereinafter more definitely pointed out and claimed, reference being had to the accompanying drawings, in which:

Figure 1 is a vertical central section through my convertible dish washing machine with parts in elevation.

Figure 2 is a bottom plan view within the upright supports.

Figure 3 is a top plan view thereof.

Figure 4 is a fragmentary section on the line 4—4 of Figure 2.

Figure 5 is a horizontal section through the dish washer showing the centrifugal blades.

Figure 6 is a section on the line 6—6 of Figure 5.

Figure 7 is a section on the line 7—7 of Figure 1, showing a dish containing basket.

Figure 8 is a top plan view of another dish containing basket mounted above the first one.

Figures 9 and 10 are front and rear plan views respectively of a washing fluid deflector forming part of the dish washing machine.

Figures 11 and 12 are detail views upon an enlarged scale illustrating the yielding means for holding the valve rod in several positions.

As shown on the drawings:

In referring to Figures 1 to 10, which illustrate the mechanism forming the dish washing machine, it will be observed that the same comprises a cylindrical casing 1 secured to a plurality of upright supports or standards 2 braced by transverse arms 3 which are integrally united by an apertured head for receiving a bearing 4 through which the main driving shaft 5 of the machine extends. The upper end of the shaft 5 is provided with a slotted recess and the lower end thereof is provided with a worm gear 6 meshing with a worm on the motor shaft 7 driven by the motor 8 supported by means of brackets attached to the arms 3. The upper end of the shaft 5 is constructed for attachment to either the dish washing mechanism, the vegetable peeler or the ice cream freezer, as will be later more fully set forth. The bottom of the casing 1 is formed by a dished plate member 9 having an annular flange 11 fitting around the lower edge of the casing 1 to which it may be secured in any well-known manner. The said plate member 9 is also provided with a central aperture coinciding with the aperture in the head of the arms 3 and is firmly secured between said head and an annular flange 10 on the bearing 4. A drain pipe 12 (Figure 4) projects through an aperture provided at a suitable point in the bottom 9 for draining the waste water and refuse from the machine.

A plurality of washing fluid deflectors 13, four in the present instance, are secured in spaced relation around the inner periphery of the casing 1 and preferably to the standards 2 and extend from near the bottom to a point of such a height that the washing fluid, when the machine is used as a dish washer, will be deflected inwardly into the dish containers.

The form of these deflectors is best shown in Figures 1, 9 and 10, as having specially curved lateral surfaces upon one side opposed to the direction of rotation of the spraying wheel with outwardly deflecting upper ends 14 projecting in a rearwardly circumferential direction, whereby the washing fluid will whirl up the deflectors and be directed against the dishes to be cleaned in the form of a fan-shaped spray. The lower ends of these deflectors are provided with horizontal lugs 15 for removably supporting a cylindrical dish holding receptacle or basket 16 having a central compartment 17 for receiving silverware or the like.

The basket 16 is constructed of wire having a bottom composed of ring members secured to radial wires upon which the edge of the plates and dishes are adapted to rest. The circumferential wall consists of spaced vertical wire rods secured to the outer ring member and an upper ring member, and spaced curved wires 16a lead from the upper ring member to a ring above the top of the silver compartment 17. The spaces between the upper curved wires 16a form dish holding means between which the dishes are inserted edgewise and retained so that the washing fluid will carry off the refuse adhering to the plates and dishes and clean the same as it runs down the front and back surfaces thereof.

A second cylindrical wire basket or receptacle 18 is suspended in the upper part of the casing 1 above the basket 16 from the annular deflector 19 having the inwardly curved flange for deflecting the washing fluid inwardly and downwardly. For this purpose, the basket 18 may be provided with an upper rim resting upon the curved flange of the said deflector 19. The casing is closed at its upper end by means of a cover 20 hinged to the casing 1 by the hinge member 21 (Figure 3) and fitting within a circular bead 22 on the casing 1.

The means for spraying the water through the container comprises a rotary spray forming wheel 23 having a central slotted hub 24 fitting over the upper end of the shaft 4 with the slots thereof engaging a pin projecting through the shaft, providing thereby a positive clutch connection whereby the wheel may be readily removed from the shaft. Below the hub 24 there is a sealing member consisting of a cap 24a flanged at its edge at 24b to fit over the shaft bearing 4, and also formed with an intermediate flange 24c fitting a groove in the upper face of said shaft bearing, whereby an effective seal is provided for the shaft bearing 4. The rotary wheel 23, which is also dished corresponding to the bottom 9 of the casing 1, is provided with a plurality of spray forming blades 25, there being two illustrated in the present instance, and each blade is provided with an inclined or upwardly sloping transversely concaved portion 26 in its forward surface and terminating in a slightly upwardly sloping straight portion 27. As the wheel 23 revolves, the washing fluid will be scooped up and cascaded upwardly in a flaring fan-like volume against the dishes to be washed, centrifugal force carrying it outwardly against the casing where the deflectors 13 are encountered that deflect the same inwardly and rearwardly against the receptacles. For the purpose of readily removing the spray forming wheel when desired, a handle 28 may be secured to the hub 24, as shown in Figures 1 and 6.

The washing fluid is adapted to be put into the lower part of the casing to cover the spray forming wheel, and after a charge of dishes has been washed and it is desired to drain the waste water and refuse from the machine, the valve 29 connected to the pipe 12 by a valve housing is adapted to be operated by rotating a vertical rod 30 (Figure 4) extending to a point near the top of the housing where it projects through the horizontal flange of a bracket 31 secured to the casing 1. The upper end of said rod is provided with a handle 32 (Figure 3) whereby the same may be rotated.

In order to securely hold the valve in either open or closed position, the rod 30 is provided with a crank 30a, as shown in Figure 11, and a spring 33 connects the crank and the casing 1, the tendency of the spring being to snap the rod to open or closed position, as shown in Figure 12, when the same has been moved to a point just beyond the dead center position shown in Figure 11.

When the machine is used as a dish washer, the silverware is placed within the compartment 17 and the plates and larger dishes are inserted and retained edgewise between the wires 16a of the basket 16 and the cups and glasses and the like are placed in the upper basket. A sufficient supply of washing fluid is then put into the casing through the top. The cover is then tightly closed and the the motor started. The rotation of the motor will rotate the main driving shaft 5 through the worm gearing, rotating thereby the spray forming wheel 23 in a counter-clockwise direction. The rapid rotation of the spray forming wheel and the structure of the concave sloping portion will scoop and cascade the washing fluid upwardly in a flaring volume through the dish holding baskets to cleanse the dishes, the water that is dashed outwardly by centrifugal force striking the spiral curved surface of the deflectors 13 which deflect it rearwardly and inwardly into the dish receptacles, the water striking the upper deflectors 19 being deflected downwardly and inwardly. The spent fluid in returning will carry the refuse washed from the plates to the bottom of the casing below the wheel 23 which is spaced a sufficient distance from the bottom for this purpose.

I am aware that numerous details of construction may be varied through a wide range without departing from the principles of this invention, and I therefore do not purpose limiting the patent granted otherwise than necessitated by the prior art.

I claim as my invention:

In a dish washing machine, a spray forming wheel having a socket, a driving shaft having an upper end designed removably to receive said socket in clutched relation, and a sealing member comprising a cap flanged at its edge to fit over the shaft bearing and also having an intermediate annular flange fitting a groove in the top of said bearing.

In testimony whereof I have hereunto subscribed my name.

CHARLES F. SMITH.